Oct. 16, 1928. 1,687,660
F. H. CUMMER
MIXER FOR ROAD MATERIALS
Filed Nov. 19, 1925     2 Sheets-Sheet 2
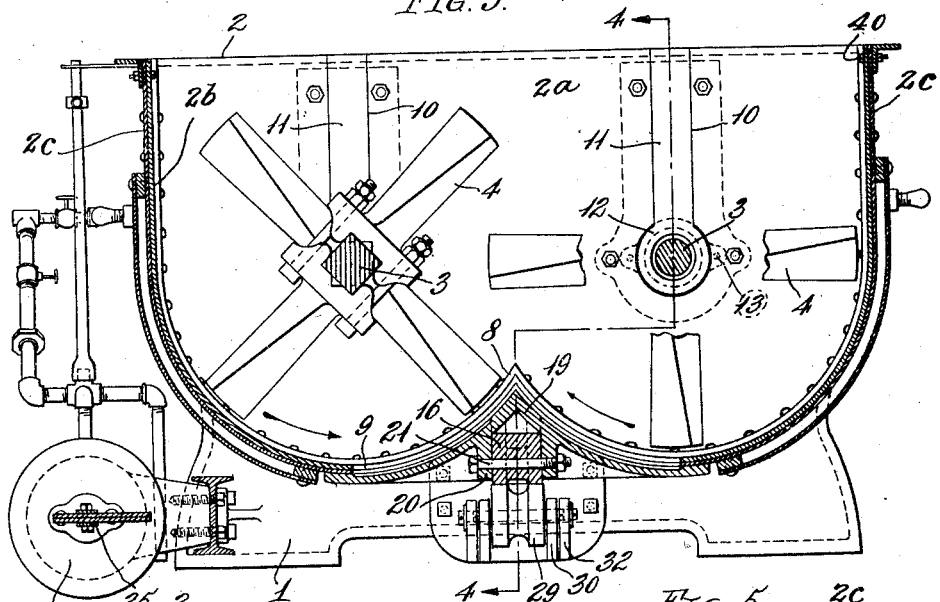
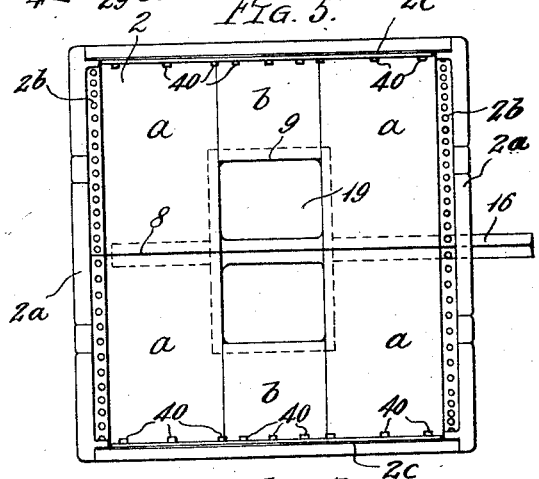
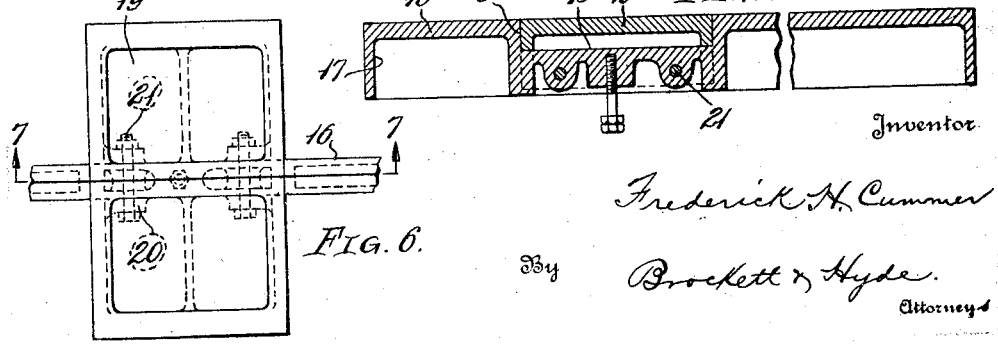
Inventor
Frederick H. Cummer
By Brockett & Hyde.
Attorneys Patented Oct. 16, 1928.

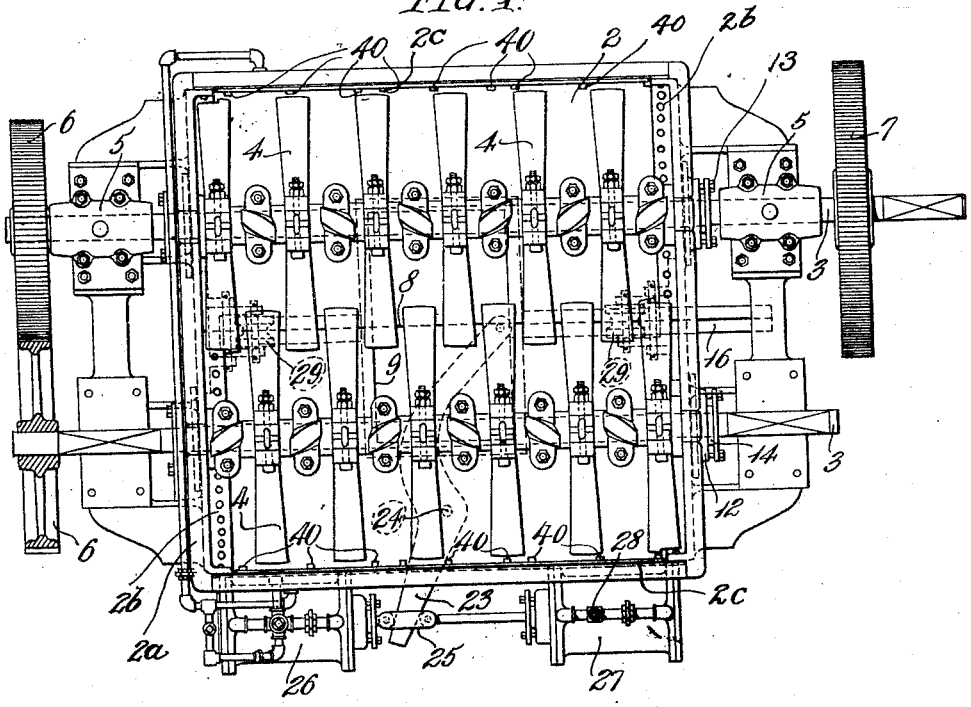
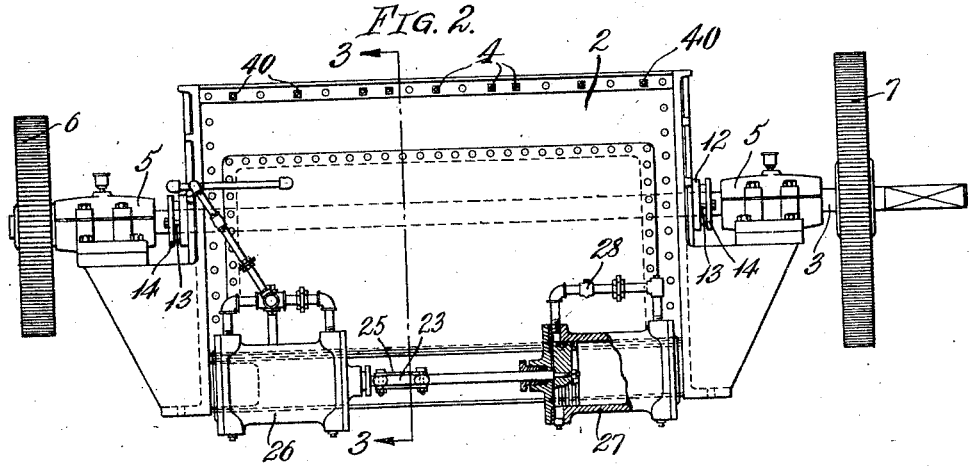

1,687,660

UNITED STATES PATENT OFFICE.

FREDERICK HENRY CUMMER, OF LOS ANGELES, CALIFORNIA.

MIXER FOR ROAD MATERIALS.

Application filed November 19, 1925. Serial No. 70,104.

This invention relates to mixers, such as are used for mixing road materials, for example for mixing crushed stone or rock with asphalt or other binder.

The object of the invention is generally to improve such mixers in a manner to avoid wear and tear and reduce the costs and necessities for repair and replacement as well as improve the operation and avoid leakage. The particular features of the invention will be more apparent from the description and drawings hereinafter referred to.

In the drawings, which represent one suitable embodiment of the invention, Fig. 1 is a plan view; Fig. 2 is a side elevation; Fig. 3 is a cross section on the line 3—3, Fig. 2; Fig. 4 is a detail sectional elevation on the line 4—4, Fig. 3; Fig. 5 is a plan view of the container with the mixing beaters omitted; Fig. 6 is a plan view of the gate or valve; and Fig. 7 is a detail section on the line 7—7, Fig. 6.

The mixer shown in the drawings comprises a suitable frame 1 designed for securement to a suitable support such as the frame of an asphalt plant and on which is mounted a tank or receptacle 2 of rectangular form in plan view and including end walls $2^a$, to the flanges $2^b$ of which is riveted a sheet metal casing or jacket $2^c$. Two parallel shafts 3 provided with beaters or arms 4 extend longitudinally through the end walls $2^a$ and are journalled in bearings 5 on the frame. The two shafts are interconnected by the gears 6 and one thereof is driven by any suitable prime mover, such as by a belt passing over the belt pulley 7. As shown in Fig. 3 the zones of travel of the two sets of beaters overlap and the bottom of the receptacle is curved in the form of two intersecting cylinders, the wall surfaces being fairly close to the ends of the beaters and the two intersecting surfaces forming an upwardly extending ridge, marked generally 8, extending longitudinally along the center line. Viewing the receptacle in plan view, as in Fig. 5, it is provided with a central opening 9 normally closed by a gate or valve, shown in Fig. 6, said gate having longitudinal sliding motion to expose the opening and permit the material to flow outwardly into a suitable receiver for conveying it to the job.

Mixers of this kind are large heavy affairs due to the necessity of churning up a mass of crushed fragments of hard rock and the workmanship at best is fairly crude and rough. As a consequence it has heretofore been practically impossible to fully protect either the shafts or the jacket wall where the shaft passes through the wall to its journal and chips of hard rock lodging in the recess or opening not only wear the parts, but may bend and even cut through the shaft. To avoid such unnecessary wear and the labor and expense of replacing shafts I have provided suitable guarding means for the joints between the shafts and the casing wall. As illustrated the casing of the receptacle at each end of each shaft is provided with a vertical slot 10 open at its upper end and enlarged in circular form at its bottom and covered by a plate 11 bolted or riveted to the outside of the casing wall. Two of these plates are passed over the end of the shaft before the latter is lowered to its seat, the plates being thereafter secured to the casing wall. Each plate 11 carries a packing for its shaft end, for which purpose it is provided with a sleeve portion 12 having a shoulder $12^a$ and with threaded openings to receive bolts 13 for clamping to it a gland 14 and to compress a packing 15 around the shaft and against the shoulder $12^a$, said packing being of hemp rope or any suitable packing material. This arrangement closes the joints and prevents rock chips or fragments from lodging in the recess and being carried around with the shaft or cutting through the same.

The mixing receptacle is provided with a lining of sheet metal which, of course, suffers considerable wear due to the dragging of the rock chips across its surface. Heretofore such linings have been made in not more than two parts, one for each of the two partially cylindrical surfaces, the two linings meeting at the apex of the ridge 8 and each being recessed along its inner edge to form its half of the discharge opening 9. As a result whenever the lining wears through it has been necessary to remove either or both of the two halves, a difficult job at best and if not requiring removal of the shafts and beaters, weighing several hundred pounds apiece, at least requiring manipulation of the lining section by three or four men to turn it and unwind it, as it were, from its position behind the beaters. The labor and lost time necessary to replace these linings, not to mention the time of delivery of new liners to the job, has frequently put asphalt plants out of commission for some time.

I have avoided considerable lost time and expense in replacing liners by making a lining for the mixer of at least six parts, each half including two long end members a and a shorter intermediate member b, all removably secured to the shell 2ᶜ by bolts 40, as shown in Figs. 2 and 5. Most of the wear is upon the intermediate portion of the liner opposite the discharge opening and is therefore concentrated upon the shorter intermediate members b. With this arrangement, when the intermediate lining sections are worn, they can be readily removed and replaced without difficult labor and without removing the shafts and beaters from the mixer. The expense for material is, of course, also reduced.

Below the discharge opening is located the longitudinally sliding gate before referred to. Such gates have heretofore been made as a single casting with consequent necessity for replacing the entire casting when a part of it is worn and prohibiting use of more expensive but higher grade wear resisting material for the entire casting.

According to the present invention the gate comprises a long cast bar 16, usually recessed as at 17 to reduce its weight and peaked to fit closely beneath the peak in the lining. Intermediate its ends the upper portion of the bar is omitted to form a recess or seat 18 for the gate portion 19, which is a casting rectangular in plan view and peaked to fit the lining and which, saddle like, straddles the bar and lies in said seat 18, being provided with ears 20 extending down on each side of the bar to permit the gate and bar to be rigidly secured by bolts 21. With this arrangement the bar can be made of steel or built up from structural shapes while the gate portion 19 can be made of manganese steel or other material more resistant to wear. The bar is supported upon rollers to be described and is reciprocated endwise to open and close the discharge opening, one wall of the casing being provided with the necessary opening through which one end of the bar can move. The operating means for the gate can be of any suitable description, such as a link 22 connecting said gate to one arm of a lever 23 pivoted at 24 on the frame and having its opposite arm entering a yoke 25 in the piston rod actuated by the cylinder 26, and if desired, coupled to a suitable dash pot, such as a piston in the cylinder 27 containing glycerine or like material provided with a by-pass valve 28 which may be more or less restricted to retard the movement.

The supports for the movable gate are two like rollers 29 mounted at opposite ends of the casing. Each of said rollers is journalled on a pin carried by a U-shaped support 30 mounted to turn upon a shaft 31 carried by a bracket 32 on the frame, said bracket having one or more adjusting screws 38 mounted to engage the member 30 below its pivot 31, as shown in Fig. 4. In use of the mixer the parts wear and ordinarily the gate will drop an appreciable amount until the joint between the sliding surfaces of gate and casing open up and permit rock fragments to enter and cause wear. By adjusting the screws 38, the gate can always be pushed tightly upward against its seat on the floor of the receptacle and leakage and wear consequently may be avoided.

The mixer described is protected against wear, as it is so arranged that parts which wear may be quickly replaced at minimum cost and it thereby avoids shutdowns which would otherwise occur.

What I claim is:

A mixer for road materials, including a receptacle having its bottom in the form of two cylindrical surfaces intersecting at a peak and provided with a central opening, and a movable valve for said opening, comprising a bar extending beneath said receptacle in the peak between said intersecting surfaces and provided with a recess, a saddle like gate for said opening straddling said bar and removably seated in said recess, and means for operating said bar.

In testimony whereof I hereby affix my signature.

FREDERICK HENRY CUMMER.